(12) United States Patent
Melzl et al.

(10) Patent No.: US 11,267,421 B2
(45) Date of Patent: Mar. 8, 2022

(54) CIRCUIT ARRANGEMENT FOR DEACTIVATING AN OCCUPANT PROTECTION DEVICE AND OCCUPANT PROTECTION SYSTEM

(71) Applicant: CONTINENTAL AUTOMOTIVE GMBH, Hannover (DE)

(72) Inventors: Hubert Melzl, Obertraubling (DE); Michael Schindler, Wörth an der Donau (DE)

(73) Assignee: Continental Automotive GmbH, Hannover (DE)

( * ) Notice: Subject to any disclaimer, the term of this patent is extended or adjusted under 35 U.S.C. 154(b) by 137 days.

(21) Appl. No.: 16/799,952

(22) Filed: Feb. 25, 2020

(65) Prior Publication Data

US 2020/0269792 A1    Aug. 27, 2020

(30) Foreign Application Priority Data

Feb. 25, 2019 (DE) ............ 10 2019 202 536.6
Feb. 28, 2019 (DE) ............ 10 2019 202 740.7

(51) Int. Cl.
*B60R 21/017* (2006.01)
*B60N 2/64* (2006.01)
(Continued)

(52) U.S. Cl.
CPC ........... *B60R 21/017* (2013.01); *B60N 2/64* (2013.01); *B60R 21/01554* (2014.10); *B60R 21/23138* (2013.01)

(58) Field of Classification Search
CPC ................. B60R 21/017; B60N 2/64
See application file for complete search history.

(56) References Cited

U.S. PATENT DOCUMENTS 3,333,155 A * 7/1967 Steen .............. H02H 3/093
361/98
3,992,028 A * 11/1976 Abe ............... B60N 2/002
280/728.1
(Continued)

FOREIGN PATENT DOCUMENTS

DE      10155970 A1    7/2003
DE  102004022896 A1   12/2005
(Continued)

OTHER PUBLICATIONS

German Search Report dated Sep. 2, 2020 for corresponding German Patent Application No. 10 2019 202 740.7.

*Primary Examiner* — James A English

(57) ABSTRACT

A circuit arrangement for deactivating an occupant protection device is indicated, comprising a first switch having a first ohmic resistor connected in series with the first switch. The first ohmic resistor together with the first switch and a second ohmic resistor lying parallel to both form a first parallel connection. The circuit arrangement includes a second switch having a third ohmic resistor connected in series with the second switch. The third ohmic resistor together with the second switch and a fourth ohmic resistor lying parallel to both form a second parallel connection, the first parallel connection and the second parallel connection are connected in series with one another. A resistance value of the first ohmic resistor is greater than the resistance value of the third ohmic resistor, and a resistance value of the second ohmic resistor is greater than the resistance value of the first ohmic resistor.

12 Claims, 1 Drawing Sheet

(51) Int. Cl.
*B60R 21/015* (2006.01)
*B60R 21/231* (2011.01)

(56) References Cited

U.S. PATENT DOCUMENTS

| | | | | |
|---|---|---|---|---|
| 6,007,093 | A | * 12/1999 | Bechtle | B60N 2/2806 280/735 |
| 2002/0153189 | A1 | * 10/2002 | Young | B60R 21/017 180/268 |
| 2002/0163171 | A1 | * 11/2002 | Kraft | B60N 2/2863 280/735 |
| 2003/0117018 | A1 | * 6/2003 | Young | B60R 21/01546 307/10.1 |
| 2010/0198464 | A1 | * 8/2010 | Jones | H01H 36/0006 701/45 |

FOREIGN PATENT DOCUMENTS

| | | | |
|---|---|---|---|
| DE | 102012212802 A1 | 1/2014 | |
| DE | 102013217908 A1 | 3/2015 | |
| WO | 0144022 A1 | 6/2001 | |
| WO | WO-2015185477 A1 * | 12/2015 | H01F 7/1805 |

\* cited by examiner

CIRCUIT ARRANGEMENT FOR DEACTIVATING AN OCCUPANT PROTECTION DEVICE AND OCCUPANT PROTECTION SYSTEM

CROSS-REFERENCE TO RELATED APPLICATIONS

This application claims the benefit of German Application DE 10 2019 202 740.7, filed Feb. 28, 2019 and German Application DE 10 2019 202 536.6, filed Feb. 25, 2019. The disclosures of the above applications are incorporated herein by reference.

TECHNICAL FIELD

The disclosure relates to a circuit arrangement for deactivating an occupant protection device. Furthermore, the disclosure relates to an occupant protection system having a control circuit as well as a circuit arrangement for deactivating the occupant protection device.

BACKGROUND

The concept of switching off an occupant protection device arranged in a vehicle, such as for example an airbag, if specific prerequisites are present is known. For example, in the event of a booster seat being located on the front passenger seat, the front-seat passenger airbag must not be triggered. In the event of a rear seat being folded down, i.e. if the backrest of a rear seat is not located in an upright position and, in particular, locked in this position by a latching apparatus, it is usually the case that a corresponding airbag, such as a side airbag, should not be triggered. The status of the backrest of a rear seat or the status of the latching apparatus is in general monitored by means of sensor technology, where, depending on the vehicle and configuration of the rear seat, the latching apparatus can, for example, have one or two locking devices, where the status of the one locking device or of both locking devices is detected for the decision regarding deactivating the corresponding airbag.

SUMMARY

The disclosure provides a circuit arrangement for deactivating an occupant protection device which is as easy and inexpensive to manufacture and to evaluate as possible. In addition, the disclosure provides an occupant protection system having a control circuit as well as a circuit arrangement for deactivating the occupant protection device.

The circuit arrangement for deactivating an occupant protection device includes a first switch having a first ohmic resistor connected in series with the first switch, the first ohmic resistor together with the first switch and a second ohmic resistor lying parallel to both forming a first parallel connection, as well as a second switch having a third ohmic resistor connected in series with the second switch, the third ohmic resistor together with the second switch and a fourth ohmic resistor lying parallel to both forming a second parallel connection. The first parallel connection and the second parallel connection are connected in series with one another. In addition, the resistance value of the first ohmic resistor is greater than the resistance value of the third ohmic resistor, the resistance value of the second ohmic resistor is greater than the resistance value of the first ohmic resistor, and the resistance value of the fourth ohmic resistor is greater than the resistance value of the second ohmic resistor.

The disclosure provides that a circuit arrangement should also be designed such that it can be manufactured as economically as possible and that it can be evaluated as simply as possible by a corresponding control circuit. The disclosure therefore provides that the circuit arrangement be implemented by ohmic resistors and switches and that ohmic resistors and switches be wired up to one another in such a way, and the resistance values of the ohmic resistors be designed in relation to one another in such a way, that a safe and simple evaluation of the circuit arrangement is made possible.

The advantage of the circuit arrangement according to the disclosure is that a simple and inexpensive circuit arrangement for deactivating an occupant protection device is provided as a result.

In some examples, the resistance value of the third ohmic resistor is substantially 0Ω.

In some examples, the resistance value of the first ohmic resistor is 100Ω, the resistance value of the second ohmic resistor is 1000Ω and the resistance value of the fourth ohmic resistor is 1500Ω.

Within the context of this application, the indicated resistance values of the first, second, third and fourth ohmic resistors refer to the nominal value, i.e. the nominal resistance value.

In some implementations, in the case of the occupant protection system which has a control circuit as well as a circuit arrangement for deactivating the occupant protection device, the circuit arrangement has at least one switch which has a first ohmic resistor connected in series with the switch, the first ohmic resistor together with the first switch and a second ohmic resistor lying parallel to both forming a first parallel connection, where the control circuit detects the total resistance value of the circuit arrangement or a variable dependent thereon and compares this with at least one threshold. A first threshold is provided, where the occupant protection device is activated in the event of the first threshold being fallen short of and where the occupant protection device is deactivated in the event of the first threshold being exceeded.

The advantage of the occupant protection system is that an occupant protection apparatus is activatable or deactivatable by the control circuit on the basis of only one threshold and that a circuit arrangement having exclusively a first switch, and a circuit arrangement having a first and a second switch is evaluatable, without necessitating any change in the implementation.

An exceeding of the threshold is to be understood to the effect that a threshold is also already exceeded if the threshold is reached.

In some examples, both exclusively the first switch and alternatively a circuit arrangement having the two switches are connectable to one and the same input of the control circuit, wherein the control circuit detects the total resistance value or a variable dependent thereon of the respectively arranged circuit arrangement, and wherein the identical first threshold is used irrespective of the connected circuit arrangement.

In some implementations, the first threshold is derived from the value of the total resistance of the first and second ohmic resistor and the resistance value of the second ohmic resistor.

In some examples, the first threshold lies between the value of the total resistance of the first and second ohmic resistor and the resistance value of the second ohmic resistor, for example, the first threshold lies approximately centrally between the value of the total resistance of the first and second ohmic resistor and the resistance value of the second ohmic resistor.

In some examples having a circuit arrangement with two switches, where the resistance value of the first ohmic resistor is 100Ω, where the resistance value of the second ohmic resistor is 1000Ω, and where the resistance value of the fourth ohmic resistor is 1500Ω, the first threshold lies in a resistance range of 421Ω to 651Ω, for example, in a resistance range of 510Ω to 550Ω. The first threshold may be 530Ω.

In some examples, a second threshold is provided. The second threshold may be less than the first threshold, for example within a resistance range of 35Ω to 60Ω. The first threshold may be 55Ω. The occupant protection device is activated in the event of the second threshold being exceeded and the first threshold simultaneously being fallen short of, and where the occupant protection device is deactivated in the event of the second threshold being fallen short of. In some examples, the second threshold constitutes a short-circuit threshold.

In some examples, the first switch interacts with a first sensor in order to detect the position of a rear seat backrest. The first switch deactivates the occupant protection device, such as a side airbag, as a function of the position of the rear seat backrest, for example, of the condition of a latching apparatus for locking the rear seat backrest.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
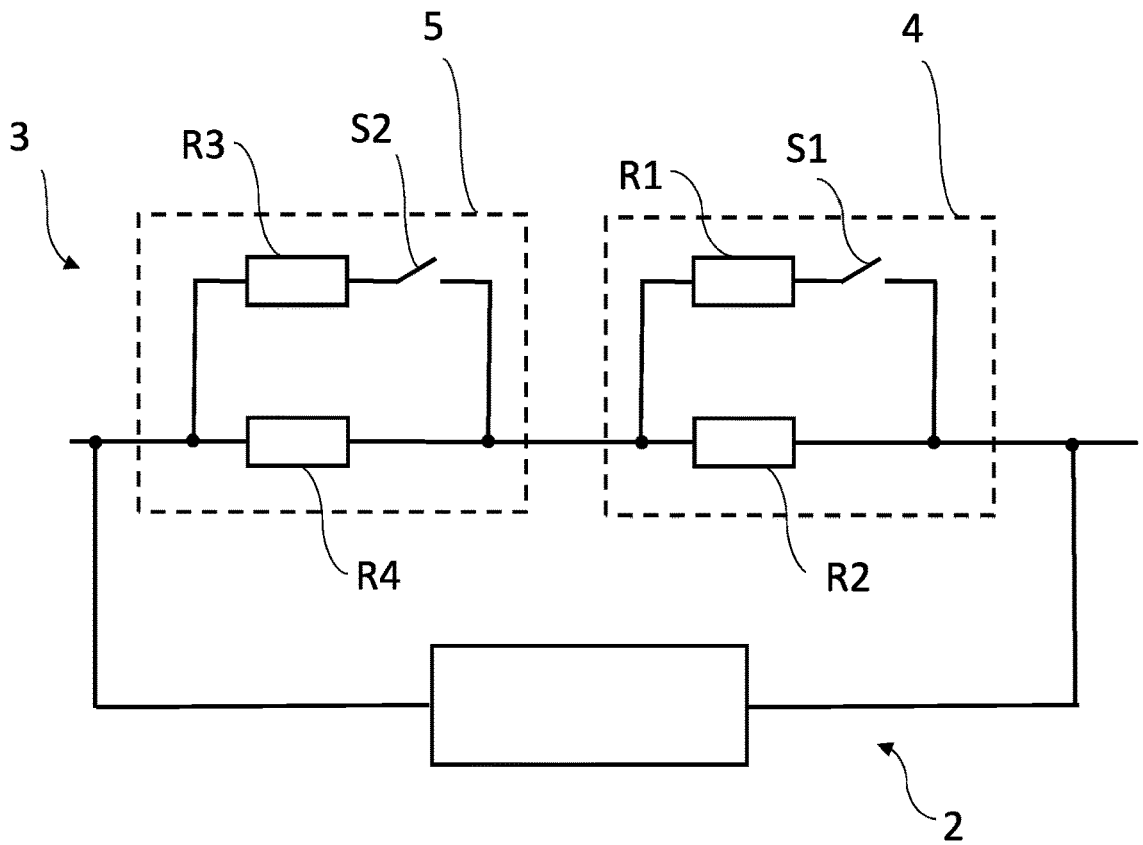
FIG. 1 shows a schematic representation of an occupant protection system having a control circuit as well as a circuit arrangement for deactivating the occupant protection device.

FIG. 1 shows an exemplary occupant protection system 1 having a control circuit 2 as well as a circuit arrangement 3 for deactivating an occupant protection device (not represented) arranged in the region of a rear seat of a vehicle and configured as a side airbag. The circuit arrangement 3 includes a first switch S1 and a first ohmic resistor R1 connected in series with the first switch S1. The first ohmic resistor R1 together with the first switch S1 and a second ohmic resistor R2 lying parallel to both form a first parallel connection 4. The circuit arrangement 3 additionally includes a second switch S2 and a third ohmic resistor R3 connected in series with the second switch S2. The third ohmic resistor together with the second switch S2 and a fourth ohmic resistor R4 lying parallel to both form a second parallel connection 5. The first parallel connection 4 and the second parallel connection 5 are connected in series with one another.

The resistance value of the first ohmic resistor R1 is 100Ω, the resistance value of the second ohmic resistor R2 is 1000Ω and the resistance value of the fourth ohmic resistor R4 is 1500Ω. The resistance value of the third ohmic resistor is substantially 0Ω.

The first switch S1 interacts with a first sensor (not represented) in order to detect the status of a first locking device of a latching apparatus for locking the backrest of the rear seat. The second switch S2 interacts with a second sensor (not represented) of a second locking device of the latching apparatus.

The control circuit 2 may be configured to detect the total resistance value of the circuit arrangement 3 as well as to compare the detected total resistance value with at least one threshold. In connection with this, a first threshold is provided. In the event of the first threshold being fallen short of, the occupant protection device is activated, in the event of the first threshold being exceeded, the occupant protection device is deactivated, i.e. switched off.

The first threshold lies approximately centrally between the value of the total resistance of the first ohmic resistor R1 and of the second ohmic resistor R2, which consequently results from the formula ((R1*R2)/(R1+R2)), and the resistance value of the second ohmic resistor R2, and is 530Ω.

In the event that the first switch S1 and simultaneously the second switch S2 are closed, which corresponds to a latched first locking device and a latched second locking device of the latching apparatus of the rear seat backrest, the total resistance value of the circuit arrangement 3 is approximately 91Ω. The first threshold of 530Ω is thus fallen short of. Consequently, this means that the occupant protection device is activated.

In the event that only the first switch S1 is closed, whereas the second switch S2 is open, which corresponds to only a latched first locking device, the total resistance value of the circuit arrangement 3 is approximately 1591Ω. In the event that only the second switch S2 is closed, whereas the first switch S1 is open, which corresponds to only a latched second locking device, the total resistance value of the circuit arrangement 3 is approximately 1000Ω. In the event that both the first switch S1 and the second switch S2 are open and, thus, both locking devices are not latched, the total resistance value of the circuit arrangement 3 is approximately 2500Ω. In all three of these cases, that is to say first switch S1 and/or second switch S2 open, the first threshold of 530Ω is consequently exceeded. This means that the occupant protection device is deactivated or switched off.

Figure 2:
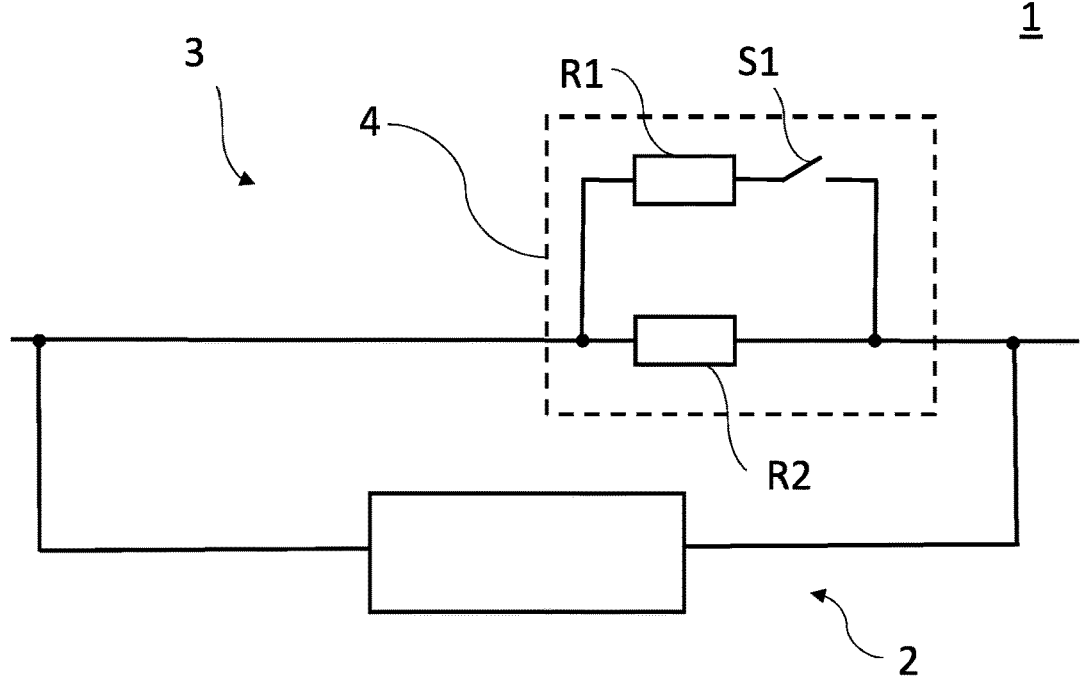
FIG. 2 shows a schematic representation of an occupant protection system having a control circuit as well as a circuit arrangement for deactivating the occupant protection device.

FIG. 2 shows an occupant protection system having a control circuit 2 as well as a circuit arrangement 3 for deactivating an occupant protection device (not represented) arranged in the region of a rear seat of a vehicle and configured as a side airbag. Unlike the example shown in FIG. 1, the latching apparatus for locking the backrest of the rear seat only has one locking device.

The circuit arrangement 3 therefore only includes a first switch S1 which interacts with a sensor (not represented) in order to detect the status of the locking device, having a first ohmic resistor R1 connected in series with the first switch, the first ohmic resistor together with the first switch S1 and a second ohmic resistor R2 lying parallel to both forming a parallel connection 4. The resistance value of the first ohmic resistor R1 is 100Ω and the resistance value of the second ohmic resistor R2 is 1000Ω. That is to say, the parallel connection 4 of the circuit arrangement 3 shown in FIG. 2 is identical to the first parallel connection 4 of the circuit arrangement 3 shown in FIG. 1.

The control circuit 2 which is likewise configured identically to the control circuit 2 represented in FIG. 1 is, in turn, configured to detect the total resistance value of the circuit arrangement 3 as well as to compare the total resistance value with at least one threshold. In connection with this, a first threshold is again provided. In the event of the first threshold being fallen short of, the occupant protection device is activated, in the event of the first threshold being exceeded, the occupant protection device is deactivated, i.e. switched off.

The first threshold lies approximately centrally between the value of the total resistance of the first ohmic resistor R1 and of the second ohmic resistor R2, which thus results from the formula ((R1\*R2)/(R1+R2)), and the resistance value of the second ohmic resistor R2, and is 530Ω.

In the event that the first switch S1 is closed, which corresponds to a latched locking device of the latching apparatus of the rear seat backrest, the total resistance value of the circuit arrangement 3 is approximately 91Ω. The first threshold of 530Ω is thus fallen short of. Consequently, this means that the occupant protection device is activated.

In the event that the first switch S1 is open, which corresponds to a non-latched locking device of the latching apparatus, the total resistance value of the circuit arrangement 3 is approximately 1000Ω. The first threshold of 530Ω is consequently exceeded. This means that the occupant protection device is deactivated or switched off.

The key thing is that the identical first threshold to that in the example according to FIG. 1 is used here. That is to say, the first threshold is used identically irrespective of the connected circuit arrangement 3.

It is made possible to connect both a circuit arrangement 3 having only a (first) switch S1 and alternatively a circuit arrangement 3 having a first switch S2 and a second switch S2 to one and the same input of the identical control circuit 2. The first threshold, which is identical in both cases, covers both embodiments, without necessitating any change in the implementation.

A number of implementations have been described. Nevertheless, it will be understood that various modifications may be made without departing from the spirit and scope of the disclosure. Accordingly, other implementations are within the scope of the following claims.

What is claimed is:

1. A circuit arrangement for deactivating an occupant protection device, the circuit arrangement comprising:
   a first parallel connection comprising:
      a first switch;
      a first ohmic resistor connected in series with the first switch; and
      a second ohmic resistor, wherein the first ohmic resistor together with the first switch and the second ohmic resistor lying parallel to both form the first parallel connection; and
   a second parallel connection comprising:
      a second switch;
      a third ohmic resistor connected in series with the second switch; and
      a fourth ohmic resistor, wherein the third ohmic resistor together with the second switch and the fourth ohmic resistor lying parallel to both form the second parallel connection,
   wherein the first parallel connection and the second parallel connection are connected in series with one another,
   wherein a first resistance value of the first ohmic resistor is greater than a third resistance value of the third ohmic resistor,
   wherein a second resistance value of the second ohmic resistor is greater than the first resistance value of the first ohmic resistor, and
   wherein a fourth resistance value of the fourth ohmic resistor is greater than the second resistance value of the second ohmic resistor.

2. The circuit arrangement according to claim 1, wherein the third resistance value of the third ohmic resistor is substantially 0 Ω.

3. The circuit arrangement according to claim 1, wherein the first resistance value of the first ohmic resistor is 100 Ω,
   wherein the second resistance value of the second ohmic resistor is 1000Ω, and
   wherein the fourth resistance value of the fourth ohmic resistor is 1500 Ω.

4. An occupant protection system comprising:
   a control circuit; and
   a circuit arrangement for deactivating the occupant protection system, the circuit arrangement comprising:
      a switch;
      a first ohmic resistor connected in series with the switch; and
      a second ohmic resistor, the first ohmic resistor together with the switch and
   the second ohmic resistor lying parallel to both form a first parallel connection,
   wherein the control circuit detects a total resistance value of the circuit arrangement or a variable dependent thereon and compares the total resistance value of the circuit arrangement or the variable dependent thereon with a first threshold,
   wherein the occupant protection system is activated in the event the total resistance value of the circuit arrangement or the variable dependent thereon is less than the first threshold, and
   wherein the occupant protection system is deactivated in the event the total resistance value of the circuit arrangement or the variable dependent thereon is greater than the first threshold.

5. The occupant protection system according to claim 4, wherein the switch is connectable to an input of the control circuit.

6. The occupant protection system according to claim 5, wherein the first threshold is derived from the value of the total resistance of the first ohmic resistor and second ohmic resistor and a resistance value of the second ohmic resistor.

7. The occupant protection system according to claim 6, wherein the first threshold is between the value of the total resistance of the first ohmic resistor and second ohmic resistor and the resistance value of the second ohmic resistor, and
   wherein the first threshold is approximately centrally between the value of the total resistance of the first ohmic resistor and second ohmic resistor and the resistance value of the second ohmic resistor.

8. The occupant protection system according to claim 4, wherein the first threshold lies in a resistance range of 421Ω to 651 Ω.

9. The occupant protection system according to claim 4, wherein the occupant protection system is activated in the event the total resistance value of the circuit arrangement or the variable dependent thereon is greater than a second threshold and the total resistance value of the circuit arrangement or the variable dependent thereon is less than the first threshold, wherein the occupant protection system is deactivated in the event the total resistance value of the circuit arrangement or the variable dependent thereon is less than the second threshold, wherein the second threshold is less than the first threshold, and wherein the second threshold lies in a resistance range of 35Ω to 60 Ω.

10. The occupant protection system according to claim 4, wherein the switch interacts with a first sensor in order to detect a position of a rear seat backrest, and wherein the occupant protection system is deactivated as a function of the position of the rear seat backrest.

11. The occupant protection system according to claim 4, wherein the occupant protection system is a side airbag.

12. The occupant protection system according to claim 10, further comprising a latching apparatus for locking the rear seat backrest, wherein the first sensor detects the position of the rear backrest based on a condition of the latching apparatus.

* * * * *